US008005825B1

(12) United States Patent
Ghosh

(10) Patent No.: US 8,005,825 B1
(45) Date of Patent: Aug. 23, 2011

(54) IDENTIFYING RELEVANT PORTIONS OF A DOCUMENT

(75) Inventor: Debajit Ghosh, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 939 days.

(21) Appl. No.: 11/236,367

(22) Filed: Sep. 27, 2005

(51) Int. Cl.
*G06F 7/00* (2006.01)
(52) U.S. Cl. .......................... 707/723; 707/729; 707/731
(58) Field of Classification Search .............. 707/3, 723, 707/729, 731; 705/500
See application file for complete search history.

(56) References Cited

U.S. PATENT DOCUMENTS

| 7,181,438 | B1 | 2/2007 | Szabo | |
|---|---|---|---|---|
| 7,200,606 | B2 | 4/2007 | Elkan | |
| 2003/0050927 | A1 | 3/2003 | Hussam | |
| 2003/0084066 | A1 | 5/2003 | Waterman et al. | |
| 2004/0054654 | A1* | 3/2004 | Nomiyama et al. | 707/1 |
| 2005/0027704 | A1* | 2/2005 | Hammond et al. | 707/5 |
| 2005/0060290 | A1* | 3/2005 | Herscovici et al. | 707/3 |
| 2005/0080774 | A1 | 4/2005 | Janssen et al. | |
| 2005/0091209 | A1 | 4/2005 | Frank et al. | |
| 2005/0125404 | A1 | 6/2005 | Corston-Oliver et al. | |
| 2006/0020596 | A1* | 1/2006 | Liu et al. | 707/6 |
| 2006/0282758 | A1* | 12/2006 | Simons et al. | 715/500 |
| 2006/0287980 | A1* | 12/2006 | Liu et al. | 707/2 |

OTHER PUBLICATIONS

In-Ho Kang et al., "Query Type Classification for Web Document Retrieval", copyright 2003 ACM.*
Google screen shot at http://www.google.com/xhtml, printed from the internet on Dec. 9, 2005, 1 page.
Tour de Westlaw at http://west.thomson.com/pdf/librarianClarkTourde.pdf, 23 pages.

* cited by examiner

*Primary Examiner* — Apu M Mofiz
*Assistant Examiner* — Cindy Nguyen
(74) *Attorney, Agent, or Firm* — Fish & Richardson P.C.

(57) ABSTRACT

Apparatus and associated systems, methods, and computer program products relate to identifying types of search query terms based on the location of information that matches the search query terms. The query terms may be assigned weights according to the query type. The assigned weights may be used, in conjunction with a scoring rule, to determine a score that indicates how relevant blocks of information in the selected document are to the search query terms. In one example, query terms that are located in the title or the URL information associated with a document are classified as a query type that is assigned little or no weight. In this way, relevance scoring within a document may be improved by discounting the influence of query terms that are likely to be primarily meaningful for locating (i.e., navigating to) a relevant document, but less meaningful for locating relevant information within a document.

40 Claims, 7 Drawing Sheets

IDENTIFYING RELEVANT PORTIONS OF A DOCUMENT

TECHNICAL FIELD

Various embodiments may relate generally to information queries, and particular embodiments may relate to methods and systems for scoring information based on a query type.

BACKGROUND

As computers and computer networks become more and more able to access a variety of dynamic web-based content, people are demanding more ways to obtain that content. Specifically, people now expect to have access, on the road, in the home, or in the office, to dynamic content previously available only from a permanently-connected personal computer hooked to an appropriately provisioned network. They want to view web pages with dynamically loaded navigation menus from their cell phones, track purchases in an online shopping cart from their personal digital assistants (PDAs), and validate entered information in online forms from their palm tops. They also want all of this dynamic content when traveling, whether locally, domestically, or internationally, in an easy-to-use, portable device.

Portability generally requires a device small in size, which in turn limits the displayable area of a display element. A display element may be a screen that displays text or other images. Some displays may be capable of displaying text and graphics in monochrome or color, and perhaps in a variety of different fonts. These capabilities enable a portable communication device, such as a cell phone, PDA, or other similar device, to display information derived from accessing the Internet, for example. However, the limited size of the display element limits the amount of information that may be displayed.

Despite the small displayable area, people may want to access information available on the Internet, or other source of information, using their portable devices. For example, people may want to use a hand held device to perform Internet searches using a search engine, such as the Google search engine, which is available at http://www.google.com/.

When web pages have content that is too large to be displayed on a small displayable area, such as that available on the display of a cell phone, the user may need to navigate through a document manually to view relevant information. For example, if a user is looking for specific information in a document displayed in a small display area, it may be necessary for the user to perform numerous navigation (e.g., scroll, next page) to locate information that is of most interest. The user may be frustrated or confused if too many navigation operations are required, or if the location process takes too long.

SUMMARY

Apparatus and associated systems, methods, and computer program products relate to identifying types of search query terms based on the location of information that matches the search query terms. The query terms may be assigned weights according to the query type. The assigned weights may be used, in conjunction with a scoring rule, to determine a score that indicates how relevant blocks of information in the selected document are to the search query terms. In one example, query terms that are located in the title or the URL information associated with a document are classified as a query type that is assigned little or no weight. In this way, relevance scoring within a document may be improved by discounting the influence of query terms that are likely to be primarily meaningful for locating (i.e., navigating to) a relevant document, but less meaningful for locating relevant information within a document.

Some embodiments may provide one or more advantages. For example, the accuracy of a relevance scoring engine may be improved by reducing the influence of terms that are primarily "navigational," i.e., meaningful for locating a document, the other "informational" terms may be emphasized in terms of their influence on determining weights to be used by the scoring engine for each query term. This makes the process of searching for relevant information in a document more efficient, more accurate, and more likely to generate a meaningful result.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
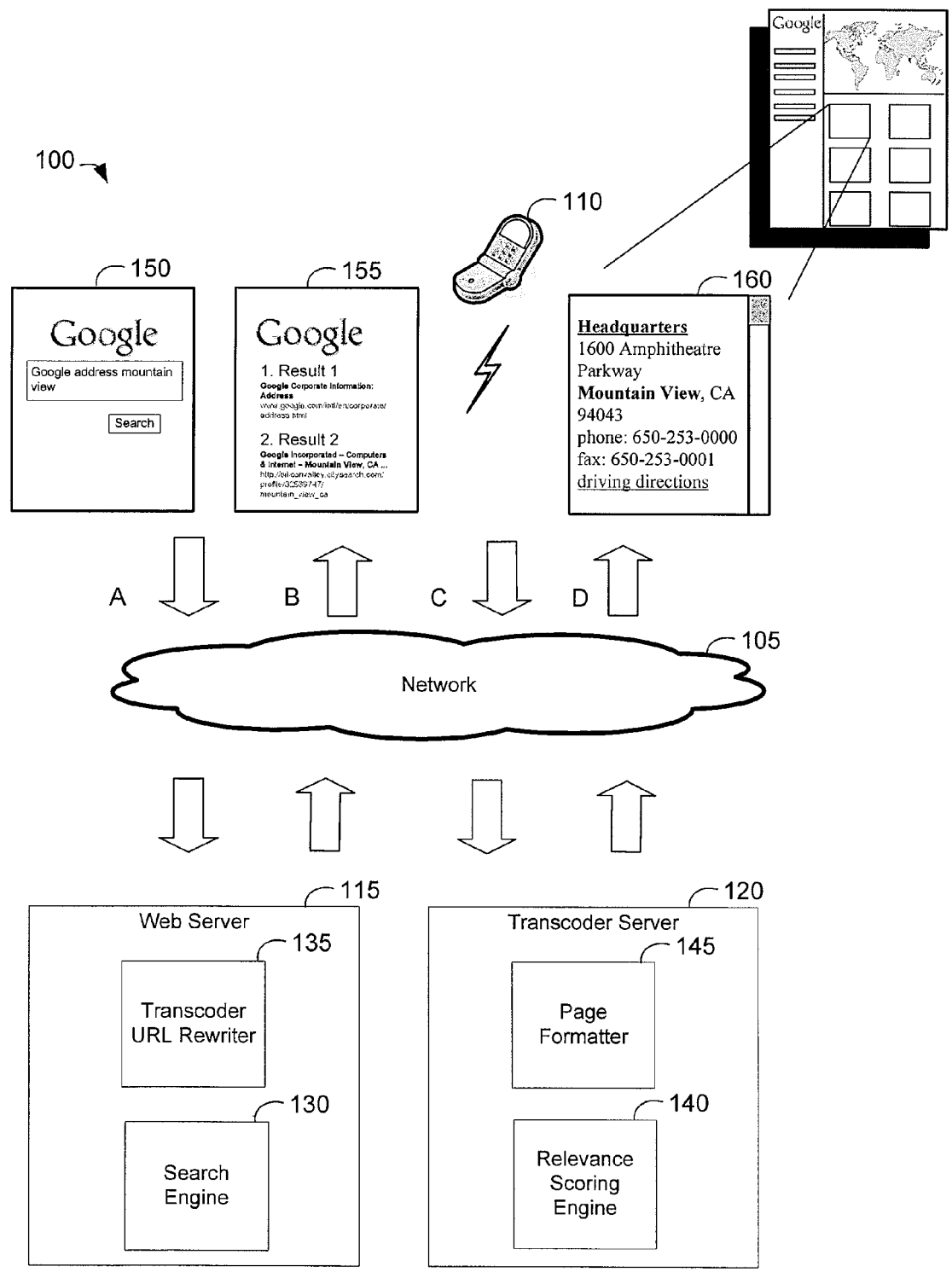
FIG. 1 is a schematic diagram showing an exemplary network system.

FIG. 1 shows an exemplary network system 100 for retrieving relevant information for display on a device, such as, for example, a cell phone or other portable computing device. In this example, the network system 100 includes a network 105, a mobile device 110, a web server 115, and a transcoder server 120. The web server 115 includes a search engine 130 and a transcoder URL rewriter 135. The transcoder server 120 includes a relevance scoring engine 140 and a page formatter 145. According to this example, the web server 115 responds to search query terms entered by the user into a search engine page 150 by returning a page 155 that displays a list of search results, wherein the hyperlinks in the results list may include a URL directed to the transcoder server 120. Encoded in this URL are the search query and the URL of the search result. Upon user selection of a link in the results, the relevance scoring engine 140 may use the search query terms to score and rank the content of the document associated with the selected link. The relevance scoring engine 140 may identify the location of the most relevant information in the document, and the page formatter 145 may transcode the document to display the most relevant information at or near the top of the display. The transcoder server 120 may send formatted page information to the mobile device 110 for display as a page 160.

The mobile device 110 can be a cell phone with an interface for connection to the network 105. The example of FIG. 1 shows the mobile device 110 communicating with the network 105 over an air interface, which may involve communication protocols or techniques, such as CDMA, TDMA, GSM, OFDM, Wi-Fi, Wi-Max, for example, or other RF (radio frequency) methods. However, this is not intended to be limiting, as other embodiments may involve transport layers that include wired, optical, or RF physical links, or a combinations of these, to transport information. In some embodiments, the information may be encoded in packets that are sent between a client device (e.g., mobile device 110) and either the web server 115 or the transcoder server 120. In various embodiments, the network 105 can include portions of the Internet, an intranet, extranet, VPN (virtual private network), LAN (local area network), WAN (wide area network), MAN (metropolitan area network), PAN (personal area network), or a combination of any of these.

In the example of FIG. 1, the mobile device 110 displays the page 160, which contains information relevant to search query terms entered in the page 150. In other embodiments, the page 160 may be displayed, for example, with the most relevant information at or near the top of the display on other devices. For example, the information may be displayed as described on a display device that is coupled to a desktop or laptop computer. In one embodiment, the system 100 may display a page having the most relevant information at or substantially near the top of the display on a small display area window (e.g., web browser frame) that has less than a predetermined area. As another example, if the entire page is deemed to be relevant, then the transcoding may begin at the beginning of the original document.

Four messages A, B, C, and D, represent a sequence of communications between the mobile device 110 and the servers 115, 120 via the network 105. The message A passes search query terms entered by the user into the page 150 as displayed on the mobile device 110. The mobile device 110 may send such a query when a user of the mobile device 110 wishes to search for information that is available via the network 105 (or other related network) using a search application, such as that available at www.google.com, that is capable of initiating a search. For example, the search may involve searching for documents available via the Internet, or documents available in an information repository. The searching functions are handled by the search engine 130. Within the web server 115, the search engine 130 may access one or more information repositories (not shown) to look for matches to the search query terms (or variations thereof). The search engine 130 identifies documents that may be relevant to the search query terms. In this example, the search engine 130 may generate a list of location identifiers (e.g., network addresses, file locations, URLs (uniform resource locators)) that are associated with the documents identified in the search. The search engine 130 may pass the generated list of location identifiers to the transcoder URL rewriter 135. In one embodiment, the transcoder URL rewriter 135 encodes (e.g., using a .cgi command) the location identifier information and search query terms into a URL that points to the URL of the transcoder server 120.

In the message B, the web server 115 sends the list of matched result to the mobile device 110. This list of matched result may display as a list for user selection, as shown on the page 155.

When the user selects one of the documents in the list on the page 155, the mobile device 110 sends the message C, including a request for the selected document. In this example, the rewritten URL routes the message C to the transcoder server 120 instead of the source location of the selected document. The transcoder server 120 may process the message C to identify the URL of the selected document and the search query terms. Within the transcoder server 120, the relevance engine 145 may process the search query terms and the user selected document and associated location information (or other ancillary document-related information) to obtain a list of portions (e.g., text or graphical images) of the document that may be ranked according to their relevance to the search query terms. In various embodiments, the relevance scoring engine 140 may receive the search query term information, for example, along with the message C, or in a message from the web server 115. In one embodiment, the page formatter 145 divides the requested document into sub-pages.

Finally, the transcoder server 120 sends the message D, which includes information to display the formatted page 160, to the mobile device 110. In some examples, the portion of the document most relevant to the search query terms is displayed at the top of the display so that the user immediately can see the text of most interest. As indicated by the position of the indicator on the scroll bar on the displayed page 160, the displayed portion of the document may be at or near the top of a sub-page, which may be the second of 5 sub-pages, for example, that together contain the entire contents of a transcoded document. In another embodiment, the displayed portion may be near the middle of the document, for example. As will be described below in further detail, the most relevant portion (e.g., text or graphical images) of the document may be displayed at or substantially near the top of the page 160.

In the Example of FIG. 1, a user is searching for a webpage containing the term "Google address mountain view" as shown in the page 150. Notice that the most relevant information, which contains search query term "mountain view," is displayed substantially near the top of the page 160, even though this information may be located at any location in the document. In this example, the relevant information appears in a table that is located in a central region of the source document. The relevant information is displayed a few lines from the top of the displayed page in this example, thereby providing context for the user. In an alternative embodiment, the words matching the search query terms "mountain view" may be displayed in the first line of the document.

In another embodiment, the web server 115 may automatically determine the most relevant document and the most relevant information in that document. As such, the web server 115 may cooperate with the transcoder server 120 to automatically send information about the top-ranked search engine results directly to the transcoder server 120, thereby bypassing the messages B, C. Accordingly, the system 100 may automatically respond to a search query by displaying, at or near the top of the client display, the most relevant information from the most relevant document identified by the search engine 130.

In one embodiment, user settings that may be local to the mobile device may also control the behavior with respect to the messages B, C. For example, a user may choose whether or not to display the most relevant information of the most relevant document without first reviewing a list of search engine results.

Figure 2A:
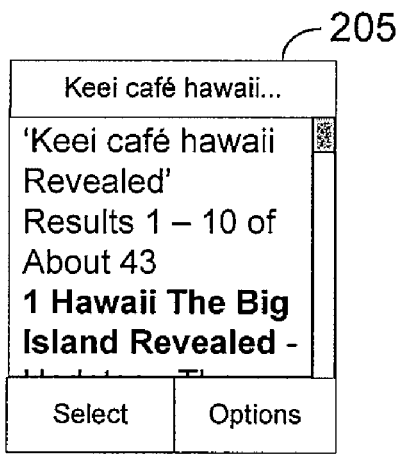
FIGS. 2A-2B are exemplary screen shots.
Figure 2B:
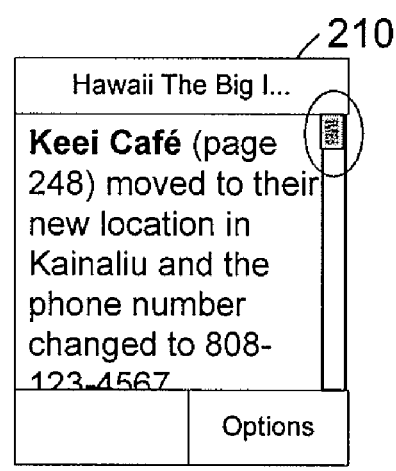

A wireless network system, such as the wireless network system 100 of FIG. 1, may produce exemplary screenshots 205, 210 on a display device, such as the mobile device 110, when performing a search query with terms "Keei café Hawaii revealed," as illustrated in FIGS. 2A and 2B.

FIG. 2A shows an exemplary screenshot 205 of a list of search results sent by the server 115 to the mobile device 110. This corresponds to the page 155 of FIG. 1. In one implementation, the list is ranked such that the first result is the most relevant. In this example, a hyperlink relating to a document entitled "Hawaii The Big Island Revealed—Updates" is highlighted.

FIG. 2B shows an exemplary screenshot 210 of a page that may be displayed when the transcoder server 120 responds to user selection of the highlighted document in the screenshot 205. The screenshot 210 displays the most relevant information from the selected document at the top of the display. In this example, the most relevant information in the selected document includes text that matches the "Keei café" portion of the search query. In this case, the transcoder server 120 formats the page so that the sentence containing the terms "Keei café" appears at the first line of the screenshot 210. The position of the scroll bar indicator on the vertical scroll bar indicates that the displayed portion of the document is at the top of the displayed sub-page, which may be, for example, about 25% of the way through the entire document. In other examples, the displayed portion of the document may begin at a point located anywhere within the document.

In one embodiment, the user may navigate to portions of the text located above the displayed portion by entering navigational input commands, such as "page up," "back," and the like.

Figure 3:
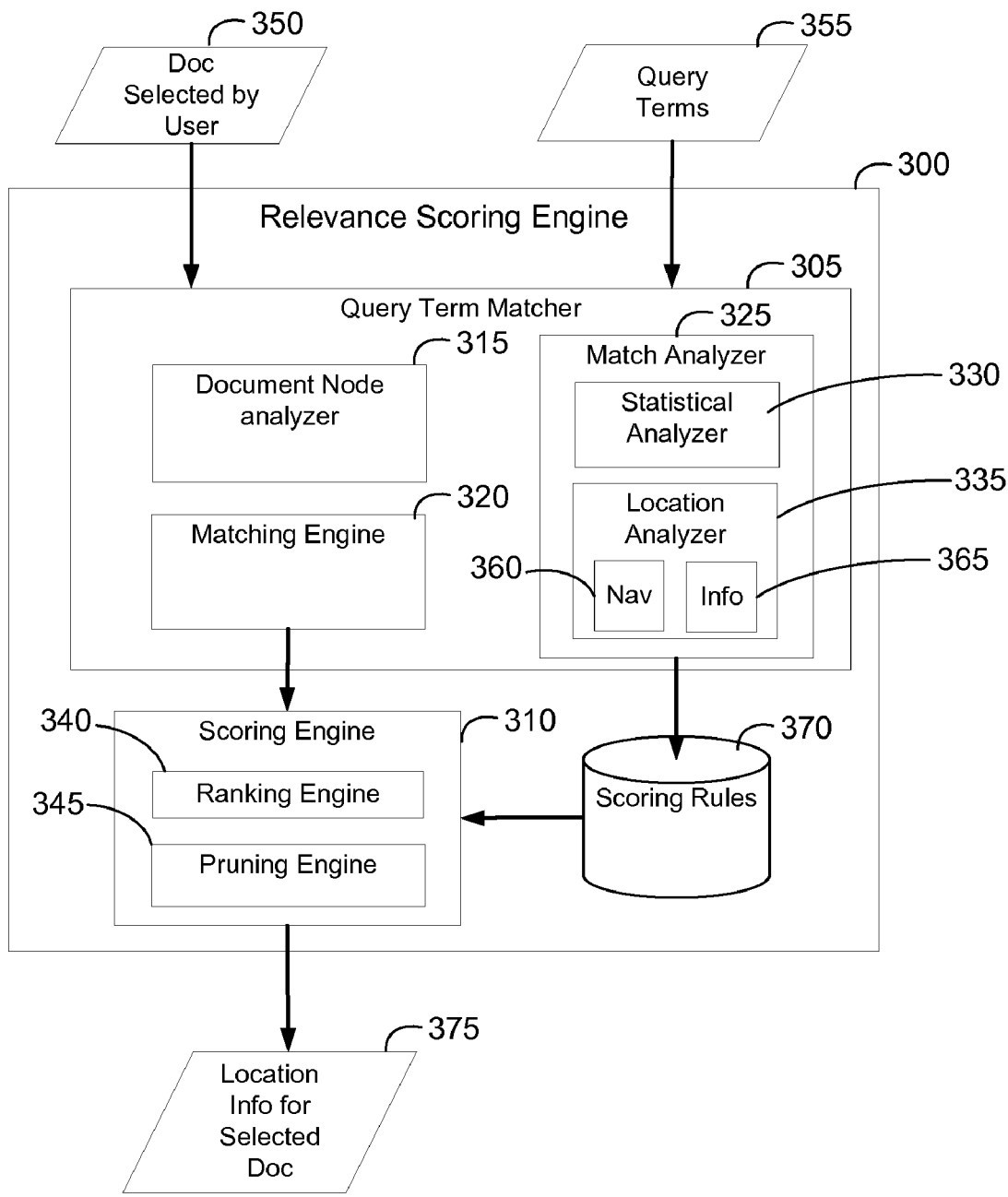
FIG. 3 is a block diagram representation of an exemplary relevance scoring engine.

FIG. 3 shows an exemplary relevance scoring engine 300 for scoring and ranking relevant information in a document according to a set of search terms. The relevance scoring engine 300 includes a query term matcher 305 and a scoring engine 310. The query term matcher 305 includes a document node analyzer 315, a matching engine 320, and a match analyzer 325. The match analyzer 325 includes a statistical analyzer 330 and a location analyzer 335. The scoring engine 310 includes a ranking engine 340 and a pruning engine 345. The query term matcher 305 matches information in a document, such as a hypertext markup language (HTML) document 350, for example, with terms 355 derived from a search query, and analyzes the matches to determine weights. The weights determined by the query matcher 305 are applied to rules that are fed to the scoring engine 310, which scores and ranks the matches to identify the locations in the document 350 that are most relevant to the search query.

The document node analyzer 315 receives a document 350, which may be selected by a user. The document node analyzer 315 scans the document 350 to identify nodes associated with textual content. In one implementation, the document 350 may be an HTML document in which text is associated with tags. Tags may be organized in a hierarchical structure (e.g., nested nodes). In some implementations, the document may be in formats other than HTML. For example, the document may be in common text document formats (e.g., .doc, .txt, .pdf, postscript), or other formats, such as XML (extensible markup language) or SGML (standard generalized mark-up language). The document node analyzer 315 may identify nodes associated with blocks of text, for example, that each has a size within predetermined limits. The document node analyzer 315 compiles a list of the identified nodes, and passes the list to the matching engine 320. The matching engine 320 may compare each of the query terms 355 to the text associated with each node in the list of nodes to identify matches.

The match analyzer 325 receives the query terms 355 and the list of nodes with matches from the matching engine 320, and analyzes the matches to determine weights that may be used to score the matches. The statistical analyzer 330, which may include statistical determining means for determining at least some of the weights, analyzes the placement of the query terms 355 within each of the nodes in the list of matching nodes. For example, the statistical analyzer 330 may evaluate the frequency of occurrence of each query term 355 within the document, the distance between each occurrence, proximity of the terms 355 to each other, and the distribution of the occurrences of the terms 355.

The location analyzer 335, which may include locating means for determining at least some of the weights associated with the query terms, may determine information for adjusting weights to be used in scoring. In one embodiment, the location analyzer 335 determines whether any of the query terms 355 are in predetermined locations within the document 350. Based upon these determinations, the location analyzer 335 may assign a type to each query term 355 is for the document 350.

The location analyzer 335 determines which type of each query term based on the location at which the query terms appear in the document. For example, the location analyzer 335 checks whether any of the query terms are located in either the title node of the document or in the URL if it is an HTML document. From the information developed by the location analyzer 335, each term in the query terms 355 is classified as either a navigational term or an informational term. Because terms that are primarily navigational may be less meaningful to locating relevant information in the document, navigational terms may be assigned a lower scoring weight than informational terms. In one embodiment, the navigational terms are discounted entirely (i.e., zero weight). The assigned weights are stored in a scoring rules database 370, where they may be accessed by the scoring engine 310. In some embodiments, the scoring rules may be hard-coded.

In one example, there may be only two predetermined query types: navigational 360 or informational 365. The location analyzer 335 may scan specified locations within the document 350 to determine whether any of the search terms 355 are located therein. If, for example, the location analyzer 335 determines that one of the search terms 355 is located in the title of the document 350, then the location analyzer 335 may determine that that query term 355 is of the navigational 360 query type. In another example, the location analyzer may scan the document or analyze metadata or other information associated with the document 350, to determine if the document 350 is associated with an uniform resource locator (URL) address, such as may be assigned to an HTML or XHTML document accessible over an intranet, extranet, or the Internet, via a hypertext transfer protocol (http) request. In other examples, the location analyzer 335 may evaluate other information indicative of query type and associated with the location of the document to identify query terms that appear in those locations. In various embodiments, each query term may be assigned a null query type until the location analyzer 335 determines the query type. In some embodiments, the query terms are assigned a query type value by default. In one example, the query terms are assigned to the informational 365 query type unless the location analyzer 335 determines that the query term is navigational 360.

The scoring engine 310 scores each node according to its relevance to the query terms 360. The scoring engine analyzes the list of nodes with matches using one of the sets of scoring rules in the scoring rules database 370 and the weights calculated by the match analyzer 315. In one embodiment, the nodes are scored using a penalty-based system, wherein the nodes start out with a predetermined score. According to the occurrence, frequency, and patterns of the query terms in the text of the node, and dictated by the nature of each of the scoring rules 370, the node score may be penalized for either adhering or not adhering to each individual rule. For example, a rule may be stated such that a node score may be penalized heavily if a given query term occurs too frequently throughout the node, or if a search term does not occur infrequently. In another example, the node score may be penalized for matching only navigational terms, in the previously mentioned embodiment. In another embodiment, matches to navigational type query terms are disregarded for purposes of scoring. In yet another embodiment, matches to navigational type query terms are weighted such that they influence the score much less than matches to informational or other types of query terms. Once the scoring of each node in the list of nodes with matches is scored, the ranking engine 340 then sorts the nodes according to each node's score. The pruning engine 345 may truncate the sorted list of nodes with matches, for example, by eliminating matches from the list of nodes that have a score below a predetermined threshold. Using the pruned and ranked list of nodes with matches, the relevance scoring engine 300 identifies location information 375 of top ranking nodes in the document.

In some examples, the statistical analyzer 330 may determine that a particular node is associated with information that is too large in size and/or too expansive in terms of the types of information that it contains. Such nodes may be sub-divided to reduce the size and scope of the information associated with any particular node. For example, a node may be associated with more than a threshold number of pieces of information (e.g., words, pictures, graphical images). In some embodiments, the document node analyzer 320 may be re-invoked to sub-divide such nodes until all nodes have less than the threshold volume of information. For example, if the statistical analyzer 330 determines that a node includes 100 words, and the threshold is 50 words, then the document analyzer 315 may be re-invoked to sub-divide the node into two or more nodes. In one example, the list of nodes with matches will be updated to replace the node with 100 words with, for example, three nodes having 45, 35, and 20 words, respectively. In some embodiments, the document node analyzer 315 may sub-divide a node according to rules designed to optimize the meaningfulness of the sub-divided nodes. After updating the list of nodes with matches, the newly identified (smaller) nodes may be analyzed by the statistical analyzer 330, as described above.

Figure 4A:
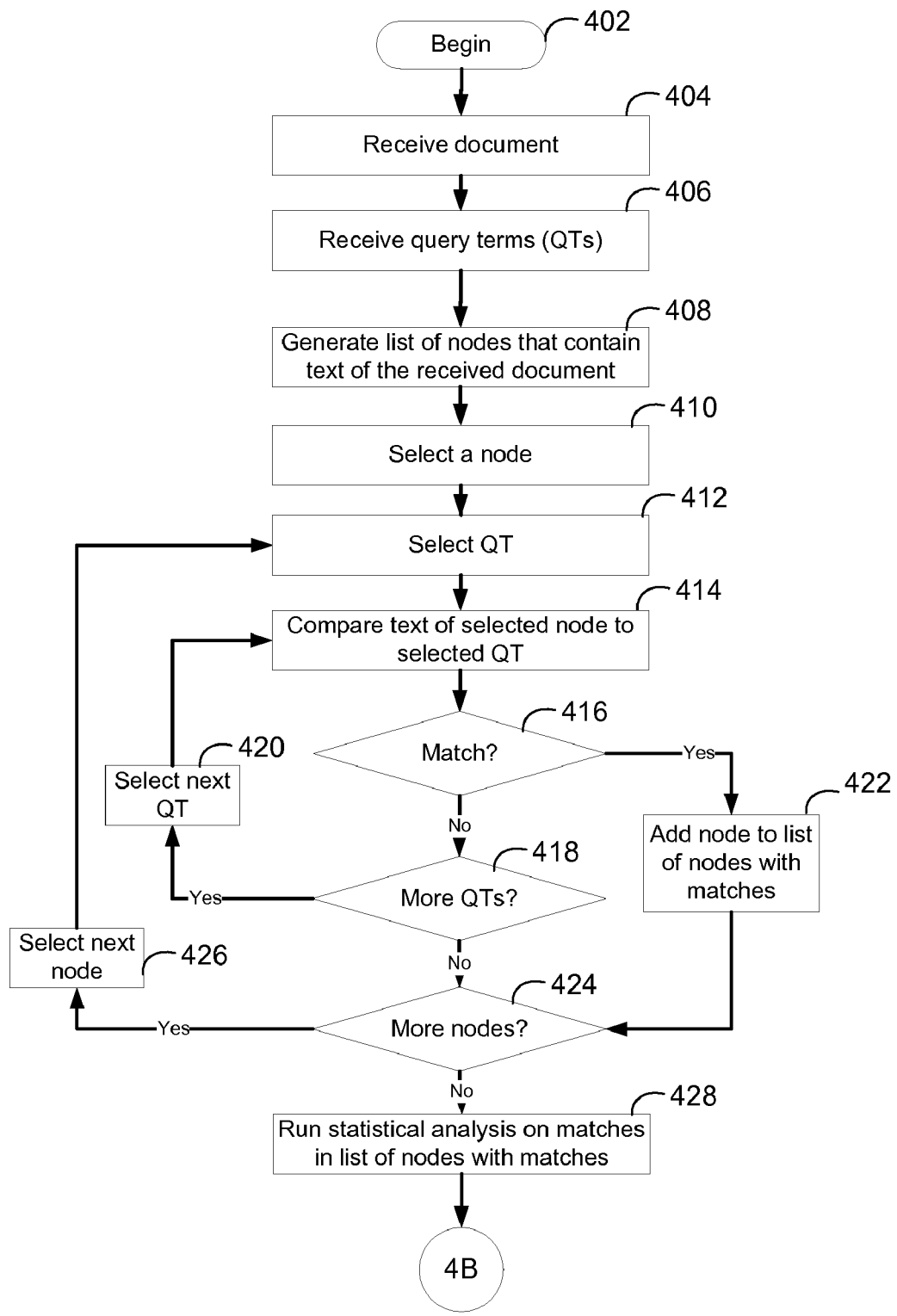
FIGS. 4A-4B are a flowchart of an exemplary method of operating the relevance scoring engine of FIG. 3.
Figure 4B:
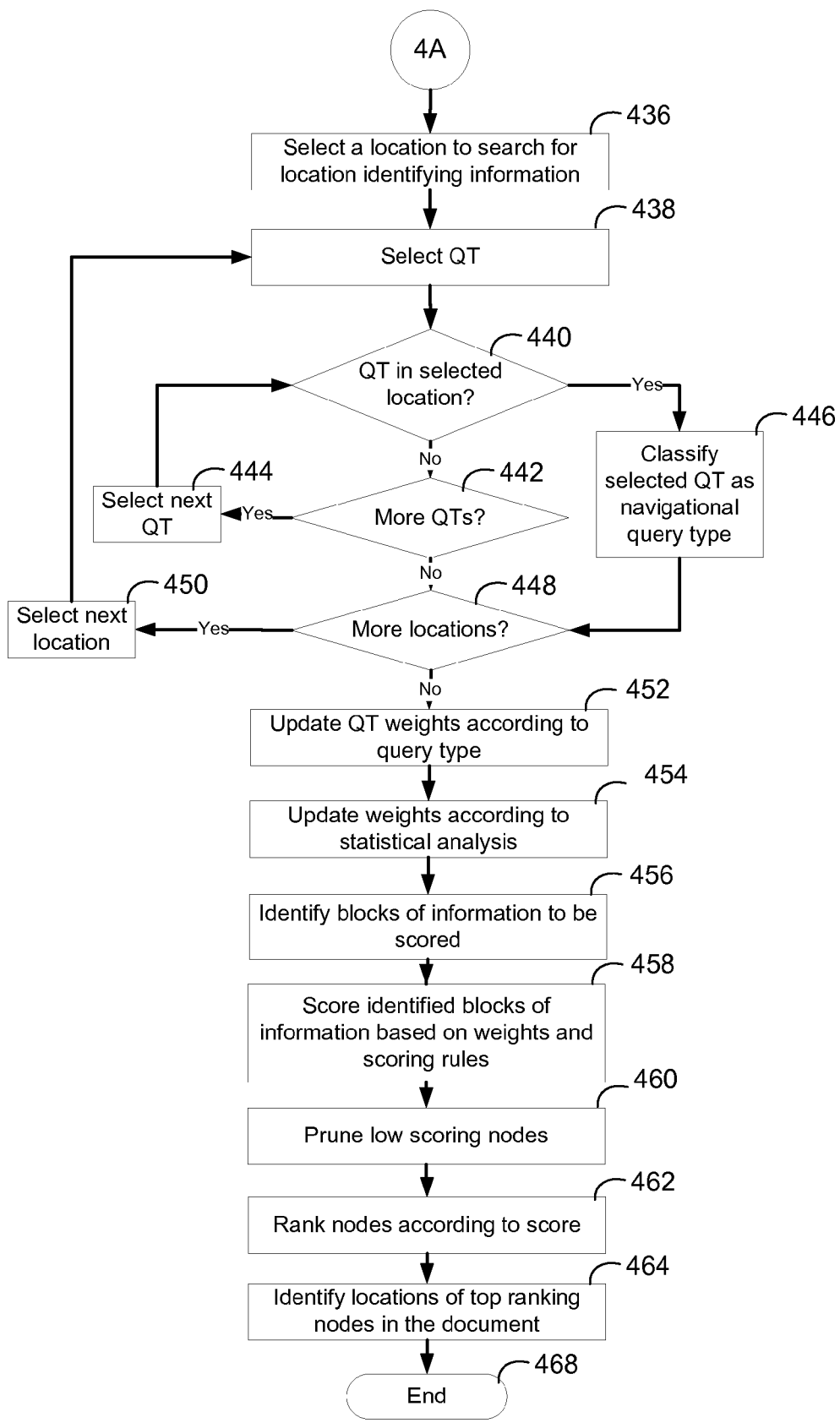

The relevance scoring engine 300 of FIG. 3 may be used to perform an exemplary method illustrated in the flowchart 400 of FIGS. 4A-4B. The method can be used to determine the location within a document of information that is most relevant to a set of search query terms.

The method begins at 402 when the relevance scoring engine 300 of FIG. 3 receives a document at step 404 and a list of query terms at step 406. At step 408, the document node analyzer 315 scans the received document to identify a list of the nodes that are each associated with information (e.g., text, graphics) in the document. In an HTML document, for example, each identified node in the list may correspond to a tag; each tag may have 0, 1, 2, or more children nodes, according to the hierarchical structure (i.e., nesting) of the tags in the document.

The matching engine 320 selects one of the nodes in the identified list at step 410, and selects one of the received query terms at step 412. Next, at step 414, the matching engine 320 compares the text associated with the selected node to the selected query term. If, at step 416, the text associated with the selected node does not contain the selected query term, then the matching engine 320 checks, at step 418, whether there are more query terms to be checked. If more query terms need to be checked, the next query term in the list of query terms is selected at step 420, and then step 414 is repeated. If, however, at step 416, the text associated with the selected node does contain the selected query term, then the matching engine 320 adds the selected node to a list of nodes with matches (i.e., matches to the query terms) at step 422.

Upon completion of step 424, or if the matching engine 320 determines, at step 418, that no more query terms need to be checked, then the matching engine 320 checks, at step 424, whether there are more nodes to evaluate. If there are more nodes to evaluate, then the next node in the list is selected at step 426, and step 412 is repeated.

If there are no more nodes to check at step 422, then, at step 428, the statistical analyzer 330 runs an analysis on the nodes in the list of nodes with matches compiled at step 422. The statistical analysis may consider various factors, such as frequency, separation, and distribution of matches of each query term. This statistical information may be used to determine weighting factors or rules to apply to score the relevance of the text at each node in the list of nodes with matches.

Next, at step 436, the location analyzer 335 selects a location within the document to search for location identifying information, and it selects a query term at step 438. At step 440, the location analyzer 335 determines whether the selected query term is present in the selected location. If the selected query term is not present in the selected location, then the location analyzer 335 checks whether more query terms remain to be checked at step 442. If more query terms remain to be checked, then the next query term is selected at step 444, and step 440 is repeated.

However, if the selected query term is present in the selected location at step 440, then the selected query term is classified as a navigational query term type at step 446. After the selected query term is classified as a navigational query term type at step 446, or if, at step 442, the location analyzer 335 determines that more query terms remain to be checked at step 442, then the location analyzer 335 checks, at step 448, whether more locations in the document need to be searched for location identifying information. If more locations remain to be checked, then the next location is selected at step 450, and step 438 is repeated.

If no more locations remain to be checked at step 448, then the query term weights are adjusted according to each query term's type classification. The query term weights are adjusted, at step 454, according to the statistical analysis results from step 428. The scoring rules, which may be stored in the scoring rules database 370, for example, may also be updated accordingly. In some implementations, some or all of the rules may be hard-coded in executable program instructions, for example.

At step 456, the scoring engine 310 may parse the nodes in the document to identify blocks of information that should be scored. Various criteria may be used to identify blocks of information that should be scored. In one implementation, the scoring engine searches for nodes in the document that are associated, either directly or through one or more levels of children nodes, with information of a suitable volume and/or type. In one example, the scoring engine 310 may traverse a hierarchy of nodes in the document by working down from the root node to locate nodes that encompass a block of information that includes, for example, a suitable number of words for scoring. A suitable number may be selected based on, for example, the performance requirements (e.g., maximum processing time, minimum quality of the relevance score). Other parameters, such as the type of content (e.g., text, graphics, audio), may be considered either separately or in combination with the volume or amount of information in order to identify blocks of information that are suitable for scoring. Some embodiments may be restricted to identifying blocks of information that are not overlapping, but other embodiments may permit a controlled amount of overlap between blocks of information.

At step 458, the scoring engine uses the scoring rules and weights to score each of the blocks of information to be scored. Next, nodes having blocks of information with relatively low scores may be pruned from the list by the pruning engine 345 at step 460. The remaining blocks of information may then be ranked according to their scores by the ranking engine 340 at step 462.

Finally, at step 464, the relevance scoring engine 300 identifies the location(s) of the top ranking block(s) of information (which may correspond to one or more nodes) in the document, and the method ends at step 466.

Figure 5:
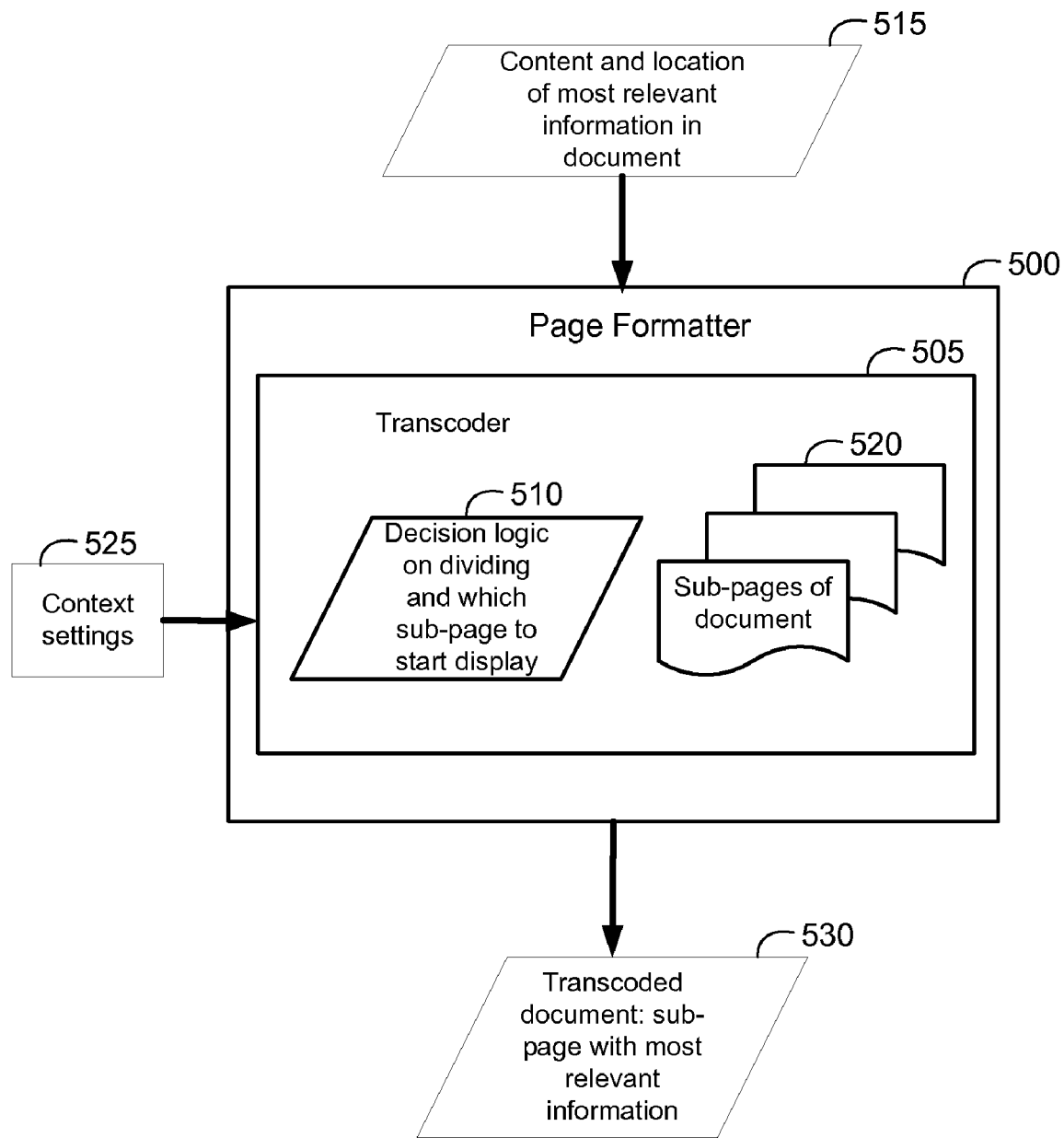
FIG. 5 is a block diagram representation of an exemplary page formatter.

The page formatter 145 of FIG. 1, which may process the information generated by the relevance scoring engine 300, is illustrated in more detail in an exemplary page formatter module 500 in FIG. 5. The page formatter 500 includes a transcoder 505 with a decision logic module 510. The decision logic module can process content and location information 515 about the most relevant information in a document. This received information 515 may include the location information 375 of FIG. 3, and may be received from the relevance scoring engine 300, for example. The decision logic module processes the received information 515 by deciding how to format the page for display on a small display area, such as the display on the cell phone 110, for example. In some embodiments, the decision logic formats the information to be displayed such that the most relevant information in the document will be displayed at or near the top of the page. Because most display device default to displaying the top of a document at the top of the display, the page formatter 500 formats the document so that the most relevant information may be immediately viewable by the user with the minimum amount of navigation (e.g., scrolling, next page, find, or look-up functions). In some embodiments, the user may view the most relevant information with little or no navigation.

The decision logic 510 may format the content of the received document 515 into one or more sub-pages 520 that are suitable to display a corresponding number of sub-pages on a small viewable display area. After the page formatter 500 processes the received information 515, taking into account current context settings 525, the page formatter 500 generates a transcoded document 530 for displaying sub-pages that contain the most relevant information at or near the top of the display.

The context settings 525 may set the context for the transcoded document 530. For example, the context settings 525 may define the number of lines to be displayed above the most relevant section of text, or whether a complete sentence or paragraph should be displayed if the words that match the query are not at the beginning of the sentence or paragraph, respectively. In another example, the context setting may control the presentation of a visual indicator on a vertical or horizontal scroll bar to show the position of the current sub-page in the whole document. Furthermore, the context settings may define a user input object that navigates to the next most relevant sub-page when selected by a user. Some other examples of context settings relate to the behavior of a scroll bar, or presenting snippets of the top-ranked information within the document that can be navigated to upon user selection. In still other embodiments, the context settings may contain parameters that determine how the more relevant information is displayed. For example, the relevant information (e.g., matches to query terms) may be highlighted with locator symbols, or emphasized (e.g., underscored, italicized, bold, different font, color, or size).

In some embodiments, the context settings may also include a depth setting that controls how many of the top ranking matches the page formatter 500 is to prepare for display. If a depth of 5 is selected, for example, then the page formatter 500 may generate 5 different transcoded documents, one for each of the top ranking matches. Accordingly, the user may be able to scan through the top five using a pre-defined "next" type user input command. Alternatively, the top 5 most relevant locations and surrounding text may be displayed as snippets on a single page that can be rapidly reviewed with a minimal amount of scrolling. User parameters may control the amount of surrounding text, for example, the number of preceding and subsequent words, sentences, or paragraphs, for example.

In some embodiments, the page formatter may include any graphic images (e.g., jpeg, bitmap, .gif, .mov, etc. . . . ), sounds (e.g., .wav, polyphonic, and recorded voice or music), or hyperlinks or other embedded objects (e.g., URL, applets, downloadable object modules) that may be embedded, linked, or otherwise associated with relevant text. In further embodiments, the context settings 525 may control whether and to what extent such information should be included in the transcoded page 530 to be sent for display.

In one implementation, some of the context settings 525 may be determined by the transcoder server 120, and some may be determined by the mobile device 110. Some of the settings may depend on the network parameters, such as transmission rates, bit error rates, packet loss rates, number of re-tries, delays, network congestion, and the like. For example, when network congestion is high, the depth may be lowered to reduce the load on the network. In some embodiments, one or more of the context settings may depend on the available bandwidth or memory of the mobile device 110 (or other client device).

Figure 6:
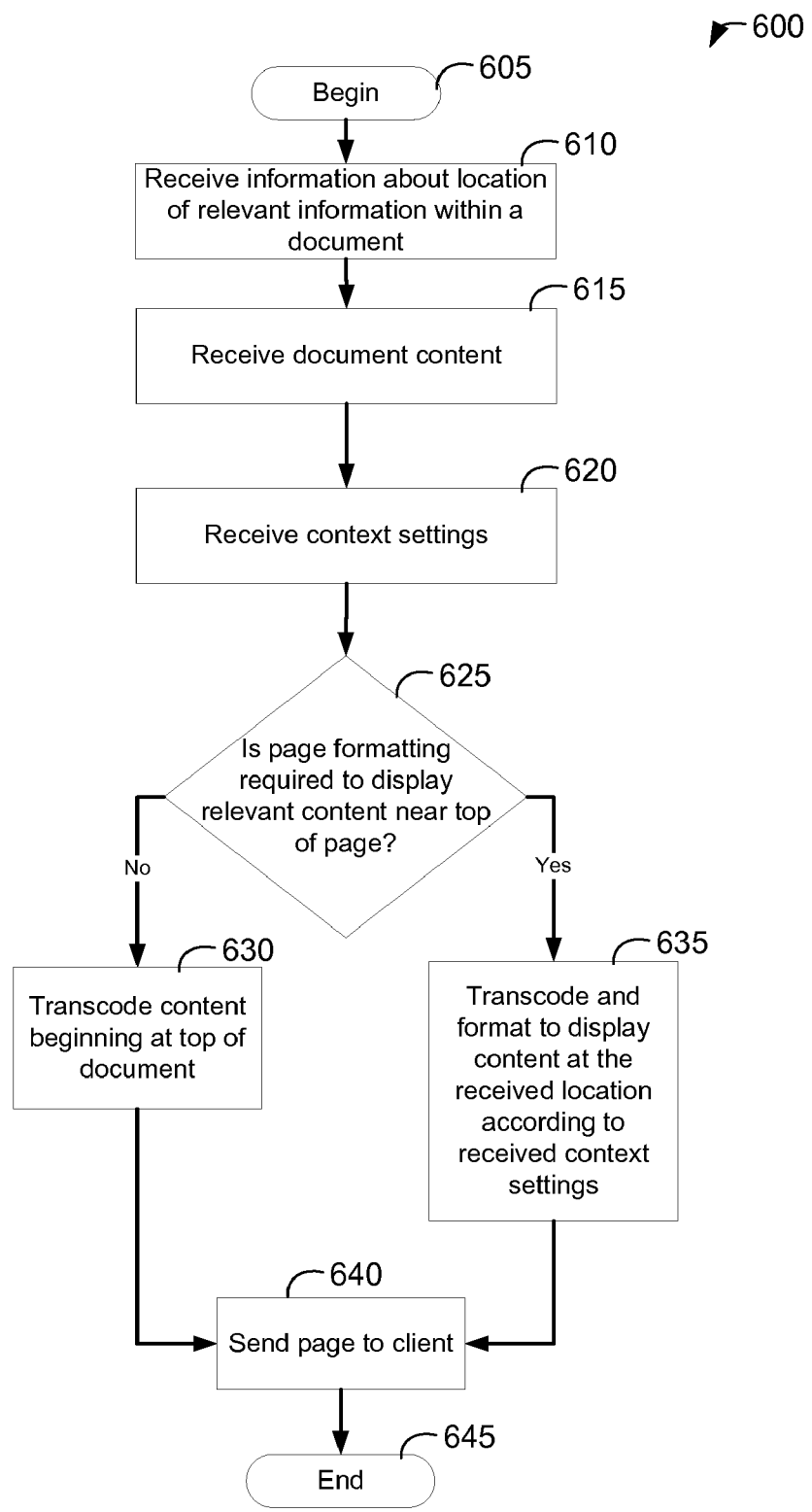
FIG. 6 is a flowchart of an exemplary method of operating the page formatter of FIG. 5.

In one embodiment, the page formatter 500 may be operated according to an exemplary method that is illustrated in a flowchart 600 of FIG. 6. The method may be performed by the page formatter 500 to display the output of the relevance scoring engine 300, according to the context settings 525.

The method begins at step 605 when the page formatter 500 receives the information about the location of relevant information within a document at step 610, receives the document content information at step 615, and receives the context settings 525 at step 620. At step 625, the decision logic module 510 determines if page formatting is required to display relevant content near the top of the page. In some embodiments, the context settings may direct the decision logic not to re-format a page if the most relevant information would appear within a predetermined number of display lines on the client device, i.e., the mobile device 110.

If the decision logic module 520 determines that no formatting is required, then the transcoder 505 may transcode the document starting with the top of the document at step 630. However, if formatting is required at step 625, then the transcoder 505 may transcode and format the document to display the top ranked (i.e., highest relevance score) information at or substantially near the top of the first sub-page to be displayed on the mobile device 110. The formatting may be tailored according to the context settings 525, as described elsewhere herein.

In an example, the received document may be formatted according to the context settings that are received from the user. These user-defined context settings indicate a preferred method of displaying the relevant data within the document. In one implementation, the user may select a context that displays the top of the document as the initial view of the document for the transcoded display. Alternatively, the user may configure the display to default to the top of the most relevant sub-page within the document.

In one embodiment, the user may have the option to select a sub-page of relevant text that is not necessarily the most relevant in the document. In such embodiments, the user may select a sub-page to display, and the document may be transcoded and formatted to display the selected sub-page.

At step 640, the transcoder 505 sends the transcoded page(s) from steps 630 or 635 on the client device, i.e., the mobile device 110. Finally, the method ends at step 645.

Although one embodiment of the method has been described, other embodiments may perform the steps in different sequence, or use a modified arrangement to achieve the same primary functions, which are (1) to identify the most relevant information in a document by discounting the weight given to terms that are primarily navigational, and (2) to display the most relevant information at or near the top of a displayed page.

In an alternate embodiment to that described with reference to FIG. 1, the document returned by the relevance scoring engine 140 may be dynamically formatted to display either (1) the first line of the document or (2) the most relevant information in the document. This decision may be based upon the display area allocated for displaying the returned document. If only a small fraction of a larger display area is allocated to display the page 160, and thus the number of lines or displayable area are less than corresponding thresholds, for example, then that context information may cause the transcoded version of the document to be displayed, and more specifically the most relevant information may be displayed at or near the first line of the displayed page. However, if both the number of lines or display area allocated to display the page 160 are larger than corresponding minimum thresholds, then the display may either not be transcoded, or the page may be returned by displaying the first line of the document at the top of the page. Thus, the format of the page may be flexibly determined automatically, based on the display area provided to display the result. Other factors, such as user preference, or data rate information, may be used to dynamically determine the format for displaying the result. In some embodiments, the context information on which that decision is based may be communicated to either or both of the web server 115 and/or the transcoder server 120. In other embodiments, the transcoder server may send information for displaying both versions of the page, and the mobile device 110 may determine locally which version to display.

Although an exemplary document retrieval system, which may identify documents relevant to terms of a search query, has been described with reference to FIG. 1, other implementations may be deployed in other applications.

In various embodiments, the client device may communicate with the servers using suitable communication methods, equipment, and techniques. For example, the client may communicate with the server or other devices using point-to-point communication in which a message (e.g., a packet-based frame) is transported directly from the source to the receiver over a dedicated physical link (e.g., fiber optic link, point-to-point wiring, daisy-chain). Other embodiments may transport messages by transmitting packets over a distributed communication network, for example, by using omni-directional radio frequency (RF) signals, while still other embodiments may transport messages characterized by high directivity, such as RF signals transmitted using directional (i.e., narrow beam) antennas or infrared signals that may optionally be used with focusing optics. Still other embodiments are possible using appropriate interfaces and protocols such as, by way of example and not intended to be limiting, RS-232, RS-422, RS-485, 802.11a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In some embodiments, each client device may be programmed with the same information and be initialized with substantially identical information stored in non-volatile memory. In other embodiments, one or more client or server devices may be custom configured to perform specific functions.

The functions and processes (including algorithms) may be performed in hardware, software, or a combination thereof. For example, some features of the system may be implemented in computer programs capable of executing on programmable computers. Such computer program products may be implemented in one or more modules written in a high level procedural or object-oriented programming language to communicate with a computer system or other machine. Furthermore, each such module may be stored on a storage medium such as non-volatile memory (NVM) (e.g., flash, EEPROM, ROM, magnetic storage media), or volatile memory (e.g., RAM), or tangibly embodied in a physical (e.g., electromagnetic (RF, optical, conducted) point-to-point, narrow beam, or broadcast) signal encoded with information, for example. Such computer program products contain information that is readable, either directly or indirectly (i.e. after compilation, assembly, linking, etc.), by a general or special purpose programmable computer or processor to perform one or more aspects of the functions described above. The functions and processes (including algorithms) may be implemented in a computer program product stored on a computer readable medium and containing instructions that, when executed on a processer, cause the processer to perform operations.

A number of embodiments of the invention have been described. Nevertheless, it will be understood that various modifications may be made without departing from the spirit and scope of the invention. For example, advantageous results may be achieved if the steps of the disclosed techniques were performed in a different sequence, if components in the disclosed systems were combined in a different manner, or if the components were replaced or supplemented by other components. Accordingly, other embodiments are within the scope of the following claims.

What is claimed is:

1. A method comprising:
    receiving, at a computer server system and from a computing device, a search query that includes multiple search query terms;
    identifying, by the server system, a particular document that corresponds to a search result that is responsive to the search query;
    identifying, by the server system, each of the search query terms that matches information that is in a predetermined location in the particular document;
    classifying, by the server system, each identified search query term as being of a first query type;
    classifying, by the server system, each non-identified search query term as being of a second query type;
    assigning, by the server system, a weight value to each of the identified and non-identified query terms, the assigned weight being based on the classified query type;

identifying, by the server system, multiple separate portions of the particular document;

determining, by the server system, a score for each of the multiple portions of the particular document using the assigned weight value for each of the identified and non-identified query terms; and determining, by the server system, a prominently-ranked portion of the particular document that has a prominently-ranked score in comparison to other scored portions.

2. The method of claim 1, wherein the particular document is a hypertext mark-up language (HTML) document, wherein the predetermined location comprises a title tag in the particular document.

3. The method of claim 1, wherein the predetermined location comprises a title of the particular document.

4. The method of claim 1, wherein the predetermined location comprises a location identifier representative of a location at which the particular document may be accessed.

5. The method of claim 4, wherein the location identifier comprises a uniform resource locator (URL).

6. The method of claim 1, further comprising initializing each of the search query terms as being of the second type.

7. The method of claim 1, wherein the weight assigned to each query term of the first type is substantially less than the weight assigned to query terms of the second type.

8. A computer program product stored on a non-transitory computer readable medium and containing instructions that, when executed on a processor, cause the processor to perform operations comprising:

transmitting, from a computing device and to a computer server system, a search query that includes multiple search query terms;

identifying a particular document that corresponds to a search result that is responsive to the search query;

identifying each of the search query terms that matches information that is in a predetermined location in the particular document;

classifying each identified search query term as being of a first query type;

classifying each non-identified search query term as being of a second query type;

assigning a weight value to each of the identified and non-identified query terms, the assigned weight being based on the classified query type;

identifying multiple separate portions of the particular document;

determining a score for each of the multiple portions of the particular document using the assigned weight value for each of the identified and non-identified query terms; and determining a prominently-ranked portion of the particular document that has a prominently-ranked score in comparison to other scored portions.

9. The computer program product of claim 8, wherein the predetermined location comprises a title of the particular document.

10. The computer program product of claim 8, wherein the predetermined location comprises a URL at which the particular document may be accessed.

11. The computer program product of claim 8, further comprising an operation to initialize each of the search query terms as being of the second type.

12. The computer program product of claim 8, wherein the weight assigned to each query term of the first type is substantially less than the weight assigned to query terms of the second type.

13. A method comprising:

receiving, at a computer server system and from a computing device, a search query that includes multiple search query terms;

transmitting, by the server system and to the computing device, a plurality of search results that are responsive to the received search query;

receiving, at the server system and from the computing device, an indication of a user-selection of a search result in the plurality, wherein a selected document corresponds to the selected search result;

identifying, by the server system, each of the search query terms that matches information in either (i) a title of the selected document, or (ii) a location identifier representative of a location at which the document may be accessed;

classifying the identified search query terms as being of a first query type;

classifying non-identified search query terms as being of a second query type;

assigning a weight value to each of the identified and non-identified query terms, the assigned weight being based on the classified query type, wherein the weight value assigned to each query term of the first type is substantially less than the weight assigned to query terms of the second type;

identifying, by the server system, multiple separate portions of the selected document;

determining, by the server system, a score for each of the multiple portions of the particular document using the assigned weight value for each of the identified and non-identified query terms; and determining, by the server system, a prominently-ranked portion of the particular document that has a score that is prominently ranked in comparison to other scored portions.

14. The method of claim 1, wherein the query terms of the first query type are assigned zero weight.

15. The method of claim 1, further comprising:

transmitting, by the server system and to the computing device, a plurality of search results that are responsive to the received search query; and receiving, at the server system and from the computing device, an indication of a user-selection of a search result in the plurality, wherein the particular document is a document that corresponds to the selected search result.

16. The method of claim 1, wherein each portion of the particular document is a portion of the document that is enclosed by a set of tags, wherein the document includes multiple sets of nested tags.

17. The method of claim 1, further comprising:

formatting, by the server system, a new document so that the prominently-ranked portion is presented for display at a top portion of a page, wherein the particular document is formatted so that the prominently-ranked portion is not presented for display at a top portion of page; and transmitting, from the server system and to the computing device, the formatted document.

18. The method of claim 1, further comprising:

determining, by the server system, other prominently-ranked portions of the particular document that also have a prominently-ranked score;

generating, by the server system, a new document for each of the prominently-ranked portions, wherein each new document includes content from a corresponding prominently-ranked portion; and transmitting, from the server system to the computing device, a page that includes a display of one or more of the new documents when the page is presented on the computing device.

19. The method of claim 1, further comprising:
scoring, by the server system, each of the multiple portions of the particular document using the assigned weight value for each of the identified and non-identified query terms;
removing from the particular document portions that that have a non-prominent score; and
transmitting, from the server system to the computing device, the particular document with the portions removed.

20. The computer program product of claim 8, wherein the query terms of the first type are assigned zero weight.

21. The computer program product of claim 8, wherein the operations further comprise:
receiving a plurality of search results that are responsive to the received search query; and
receiving an indication of a user-selection of a search result in the plurality, wherein the particular document is a document that corresponds to the selected search result.

22. The computer program product of claim 8, wherein each portion of the particular document is a portion of the document that is enclosed by a set of tags, wherein the document includes multiple sets of nested tags.

23. The computer program product of claim 8, wherein the operations further comprise:
formatting a new document so that the prominently-ranked portion is presented for display at a top portion of a page, wherein the particular document is formatted so that the prominently-ranked portion is not presented for display at a top portion of page; and
presenting the formatted document for display on the computing device.

24. The computer program product of claim 22, wherein the operations further comprise:
presenting for display on the computing device the particular document so that a display of the particular document is pre-scrolled to the prominently-ranked portion.

25. The method of claim 13, further comprising:
identifying, by the server system, each of the search query terms that matches information in a title of the selected document, wherein the weight assigned to each query term that matches information in the title of the selected document is substantially less than the weight assigned to query terms of the second type.

26. A computer-implemented system, the system comprising:
a programmable processor; and
a non-transitory computer-readable storage medium coupled to the processor and having information stored therein, which, when executed by the processor, causes the processor to perform a method, the method comprising:
receiving, at a computer server system and from a computing device, a search query that includes multiple search query terms;
identifying, by the server system, a particular document that corresponds to a search result that is responsive to the search query;
identifying, by the server system, each of the search query terms that matches information that is in a predetermined location in the particular document;
classifying, by the server system, each identified search query term as being of a first query type;
classifying, by the server system, each non-identified search query term as being of a second query type;
assigning, by the server system, a weight value to each of the identified and non-identified query terms, the assigned weight being based on the classified query type;
identifying, by the server system, multiple separate portions of the particular document;
determining, by the server system, a score for each of the multiple portions of the particular document using the assigned weight value for each of the identified and non-identified query terms; and
determining, by the server system, a prominently-ranked portion of the particular document that has a prominently-ranked score in comparison to other scored portions.

27. The system of claim 26, wherein the particular document is a hypertext mark-up language (HTML) document, wherein the predetermined location comprises a title tag in the particular document.

28. The system of claim 26, wherein the predetermined location comprises a title of the particular document.

29. The system of claim 26, wherein the predetermined location comprises a location identifier representative of a location at which the particular document may be accessed.

30. The system of claim 29, wherein the location identifier comprises a uniform resource locator (URL).

31. The system of claim 26, wherein the method further comprises initializing each of the search query terms as being of the second type.

32. The system of claim 26, wherein the weight assigned to each query term of the first type is substantially less than the weight assigned to query terms of the second type.

33. The system of claim 26, wherein the query terms of the first query type are assigned zero weight.

34. The system of claim 26, wherein the method further comprises:
transmitting, by the server system and to the computing device, a plurality of search results that are responsive to the received search query; and
receiving, at the server system and from the computing device, an indication of a user-selection of a search result in the plurality, wherein the particular document is a document that corresponds to the selected search result.

35. The system of claim 26, wherein each portion of the particular document is a portion of the document that is enclosed by a set of tags, wherein the document includes multiple sets of nested tags.

36. The system of claim 26, wherein the method further comprises:
formatting, by the server system, a new document so that the prominently-ranked portion is presented for display at a top portion of a page, wherein the particular document is formatted so that the prominently-ranked portion is not presented for display at a top portion of page; and
transmitting, from the server system and to the computing device, the formatted document.

37. The system of claim 26, wherein the method further comprises:
determining, by the server system, other prominently-ranked portions of the particular document that also have a prominently-ranked score;
generating, by the server system, a new document for each of the prominently-ranked portions, wherein each new document includes content from a corresponding prominently-ranked portion; and transmitting, from the server system to the computing device, a page that includes a display of one or more of the new documents when the page is presented on the computing device.

38. The system of claim 26, wherein the method further comprises:

scoring, by the server system, each of the multiple portions of the particular document using the assigned weight value for each of the identified and non-identified query terms;

removing from the particular document portions that that have a non-prominent score; and transmitting, from the server system to the computing device, the particular document with the portions removed.

39. A computer-implemented system, the system comprising:

a programmable processor; and a non-transitory computer-readable storage medium coupled to the processor and having information stored therein, which, when executed by the processor, causes the processor to perform a method, the method comprising:

receiving, at a computer server system and from a computing device, a search query that includes multiple search query terms;

transmitting, by the server system and to the computing device, a plurality of search results that are responsive to the received search query;

receiving, at the server system and from the computing device, an indication of a user-selection of a search result in the plurality, wherein a selected document corresponds to the selected search result;

identifying, by the server system, each of the search query terms that matches information in either (i) a title of the selected document, or (ii) a location identifier representative of a location at which the document may be accessed;

classifying the identified search query terms as being of a first query type;

classifying non-identified search query terms as being of a second query type;

assigning a weight value to each of the identified and non-identified query terms, the assigned weight being based on the classified query type, wherein the weight value assigned to each query term of the first type is substantially less than the weight assigned to query terms of the second type;

identifying, by the server system, multiple separate portions of the selected document;

determining, by the server system, a score for each of the multiple portions of the particular document using the assigned weight value for each of the identified and non-identified query terms; and determining, by the server system, a prominently-ranked portion of the particular document that has a score that is prominently ranked in comparison to other scored portions.

40. The system of claim 39, wherein the method further comprises:

identifying, by the server system, each of the search query terms that matches information in a title of the selected document, wherein the weight assigned to each query term that matches information in the title of the selected document is substantially less than the weight assigned to query terms of the second type.

* * * * *

UNITED STATES PATENT AND TRADEMARK OFFICE
CERTIFICATE OF CORRECTION

| | | |
|---|---|---|
| PATENT NO. | : 8,005,825 B1 | Page 1 of 1 |
| APPLICATION NO. | : 11/236367 | |
| DATED | : August 23, 2011 | |
| INVENTOR(S) | : Debajit Ghosh | |

It is certified that error appears in the above-identified patent and that said Letters Patent is hereby corrected as shown below:

In the Claims:

Column 15, line 10, in Claim 19, after "that" delete "that".

Column 16, line 4, in Claim 26, delete "non- identified" and insert -- non-identified -- therefor.

Column 16, line 66-67, in Claim 37, delete "prominently- ranked" and insert -- prominently-ranked --, therefor.

Column 17, line 11, in Claim 38, after "that" delete "that".

Signed and Sealed this
Twenty-fifth Day of October, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,005,825 B1 | Page 1 of 1 |
| APPLICATION NO. | : 11/236367 | |
| DATED | : August 23, 2011 | |
| INVENTOR(S) | : Debajit Ghosh | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,235 days.

Signed and Sealed this
Thirtieth Day of October, 2012

David J. Kappos
*Director of the United States Patent and Trademark Office*